(12) United States Patent
Colich et al.

(10) Patent No.: US 7,578,479 B1
(45) Date of Patent: Aug. 25, 2009

(54) ROTATING AIR CARGO DELIVERY SYSTEM AND METHOD OF CONSTRUCTION

(75) Inventors: Joseph M. Colich, St. Louis, MO (US); Edward Barocela, Ballwin, MO (US); James Lis, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 11/613,595

(22) Filed: Dec. 20, 2006

(51) Int. Cl.
*B64D 1/12* (2006.01)
(52) U.S. Cl. .................. 244/137.4; 244/138 A
(58) Field of Classification Search .............. 244/137.4, 244/137.3, 138 A, 16, 123.11, 123.9; 294/82.26; 89/1.51, 1.54
See application file for complete search history.

(56) References Cited

U.S. PATENT DOCUMENTS

| 2,776,017 | A | * | 1/1957 | Alexander | 416/42 |
| 3,204,798 | A | * | 9/1965 | Becker | 414/607 |
| 4,932,807 | A | * | 6/1990 | Rhodes | 403/147 |
| 5,173,069 | A | | 12/1992 | Litos et al. | |
| 6,070,832 | A | * | 6/2000 | Redd | 244/137.3 |
| 6,942,184 | B1 | | 9/2005 | Morris | |
| 2005/0006525 | A1 | * | 1/2005 | Byers et al. | 244/118.1 |

* cited by examiner

*Primary Examiner*—Michael R Mansen
*Assistant Examiner*—Michael Kreiner
(74) *Attorney, Agent, or Firm*—Rozenblat IP LLC

(57) ABSTRACT

A system and method of constructing a system for delivering cargo by airdrop are provided. In short, the system uses rotor blades to slow the descent of cargo dropped from an aircraft. In one example of one embodiment, a frame is secured to a cargo pallet and at least one rotor blade is secured to the frame. The rotor blade is secured to the frame in a position such that it causes the cargo pallet and the frame to rotate in air when dropped from an elevation. In another embodiment, the rotor blade may be extendable and extend during flight.

30 Claims, 5 Drawing Sheets

ROTATING AIR CARGO DELIVERY SYSTEM AND METHOD OF CONSTRUCTION

FIELD OF THE INVENTION

The present invention relates generally to systems for delivering cargo by airdrop and methods of constructing such systems.

BACKGROUND OF THE INVENTION

Conventional systems for delivering cargo by airdrop mostly include the use of a parachute. Parachute systems and even guided parachute systems, however, often may not operate effectively in high wind conditions, leading to inaccurate drops. In military applications, missing the drop zone can result in placing the cargo into enemy hands or out of reach of the intended users. In addition, large cargo parachute silhouettes can be spotted easily during descent and after touchdown, thereby leading the enemy to the drop zone. Parachute based systems also have slow rates of descent and must be delivered at airspeeds which expose the delivery aircraft to enemy detection. Further, current individual parachute based systems have a weight restrictions of less than 3,500 pounds per cargo parachute. Payload weights in excess of 3,500 lbs require a cluster of multiple parachutes with diameters of 100 feet each. The combination of parachutes and auxiliary equipment (deployment lines, suspension slings, shock absorption materials, etc) coupled to the airdrop platform, make existing aerial delivery methods expensive and logistically time consuming. Other conventional non-parachute based systems have been developed but are prone to certain shortcomings and have therefore not been widely used. It is desirable to provide an aerial cargo delivery system that can allow the delivery aircraft to operate at higher airspeeds, in higher wind conditions, achieve accurate drops, have faster rates of descent than parachute based systems, and can deliver greater than 10,000 pounds of payload on an standard eight foot aerial delivery platform or 463L cargo pallet.

SUMMARY

A system is provided for delivering cargo by airdrop. A frame is secured to a cargo pallet and at least one rotor blade is secured to the frame. The rotor blade has a leading edge and a trailing edge and is secured to the frame in a position such that the rotor blade causes the cargo pallet and the frame to rotate in air when dropped from an elevation. A method of constructing the system is also provided.

In some embodiments, the rotor blade may be retractable, extendable, or both retractable and extendable. The rotor blade may include a spar positioned at the leading edge and a skin positioned to cover the spar. The skin may form a shape of an airfoil. The spar may, for example, be a hollow telescoping spar which is retractable and extendable. A cable may be positioned at the trailing edge of the rotor blade and the skin may cover the cable. The skin may be constructed of a nylon fabric sheath which folds as the hollow telescoping spar is retracted and unfolds to form the shape of the airfoil as the hollow telescoping spar is extended and the cable positioned at the trailing edge is pulled taut. In one example, two rotor blades may be secured to the frame. The rotor blades may be positioned on opposite sides of the frame such that leading edges of the two rotor blades are positioned to face in opposite directions.

BRIEF DESCRIPTION OF THE DRAWINGS

FIGS. 3 and 3A respectively depict a top perspective view of an example of one embodiment of a retractable and expandable rotor of a rotating cargo delivery system in a partially retracted position, and a cross-section view through line 3A-3A of FIG. 3.

DETAILED DESCRIPTION

A system and method of constructing a system for delivering cargo by airdrop are provided. In short, the system uses rotor blades to slow the descent of cargo dropped from an aircraft. The use of rotor blades provides advantages over conventional parachute systems which include but are not limited to: improved performance at higher air speeds, increased accuracy of drops, increased rates of descent, decreased probability of detection, and increased capacity.

Figure 1:
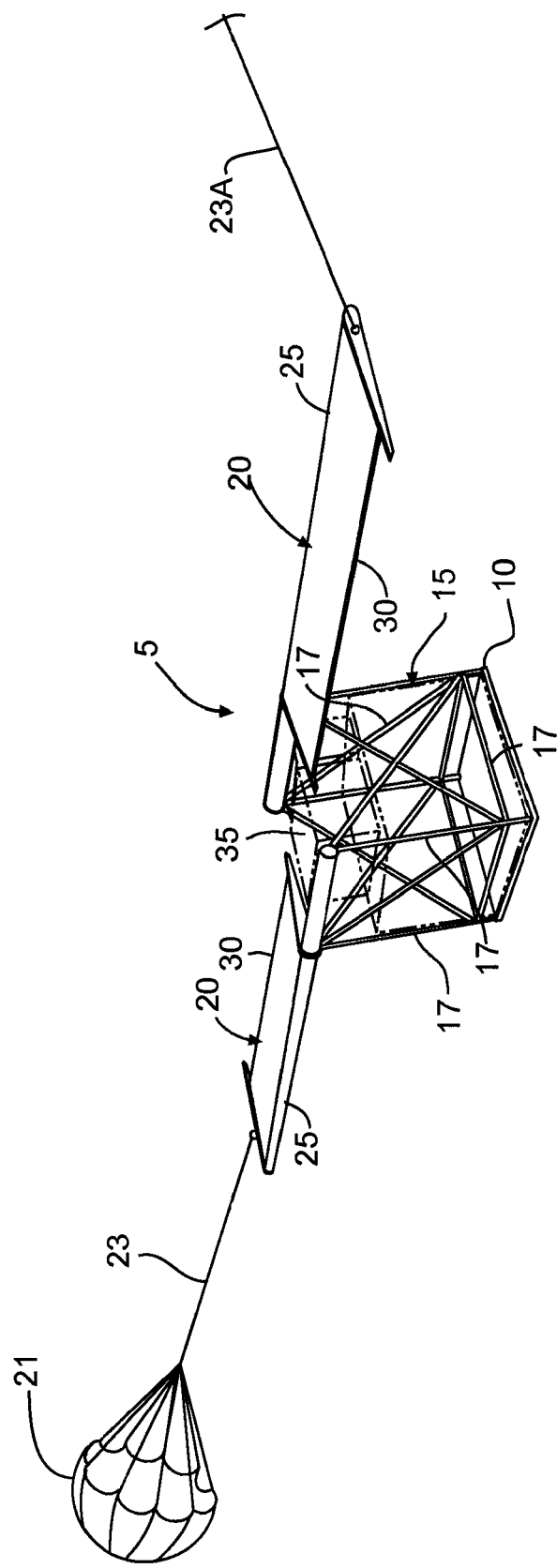
FIG. 1 depicts an example of one embodiment of a rotating cargo delivery system.

Referring to FIG. 1, all example of rotating air cargo delivery system 5 is shown having cargo pallet 10, frame 15 secured to cargo pallet 10, and rotor blades 20 secured to frame 15. Rotor blades 20 have leading edge 25 and trailing edge 30. The example in FIG. 1 shows system 5 with two rotor blades 20, but system 5 may utilize only one rotor blade or greater than two rotor blades. Rotor blades 20 may be positioned on opposite sides of frame 15 such that leading edges 25 face toward opposite directions.

Cargo 35 is loaded on to cargo pallet 10 in preparation for delivery by airdrop. Rotating air cargo delivery system 5 is dropped with loaded cargo 35 from a pre determined altitude based on mission requirements and threat conditions, typically from an airplane at high altitudes. In flight, rotor blades 20 aerodynamically induce a torque which turns cargo pallet 10 about a center of rotation producing lift in a manner similar to that of autogiro and helicopter rotors. This lift reduces the rate of descent of the system 5, which may be required to ensure that the system 5 lands without damaging or destroying cargo 35. The amount of lift will increase with an increase in size of rotor blades 20 and speed of rotation. The amount of lift may also be varied by adjusting the pitch of the rotor blades 20. The rate of descent will vary according to the amount of lift and the weight of the system 5 plus cargo 35. As lift is increased the rate of descent will decrease and as the weight is increased the rate of descent will increase. Rotor blades 20 may be scalable to allow for increased system and cargo weight.

Figure 5:
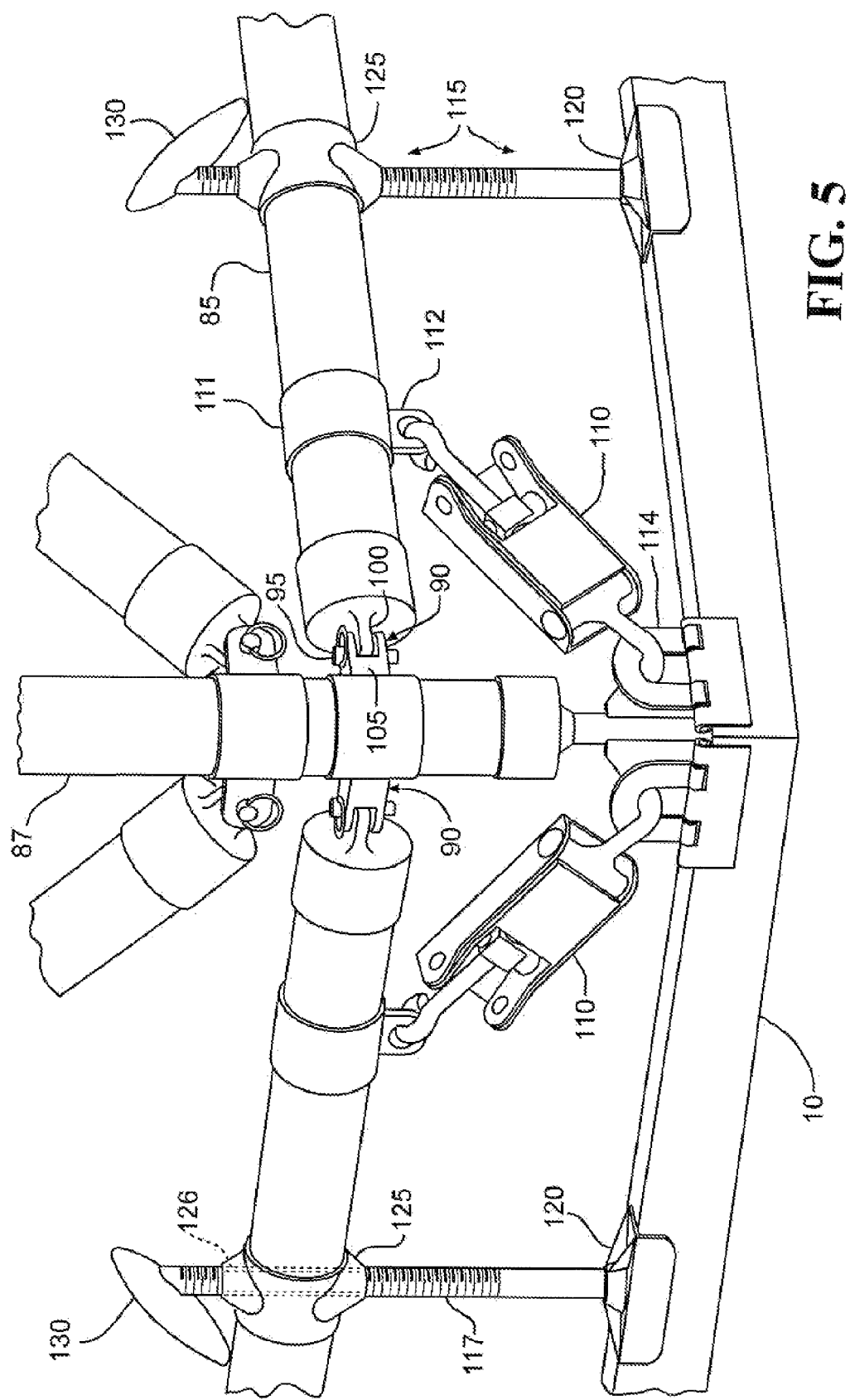
FIG. 5 depicts an example of one embodiment of frame securement to a pallet in a rotating cargo delivery system.

Cargo pallet 10 may be a new or reusable cargo pallet with a capacity of 10,000 pounds or greater. Alternatively, cargo pallets with capacities lower than 10,000 pounds may be used for delivering lower weight payloads. Standard logistic cargo pallets, such as a 463 L cargo pallet, may be used. Frame 15 may be permanently or temporarily secured to cargo pallet 10. An example of how frame 15 may be secured to cargo pallet 10 is shown in FIG. 5 and described below.

Figure 2:
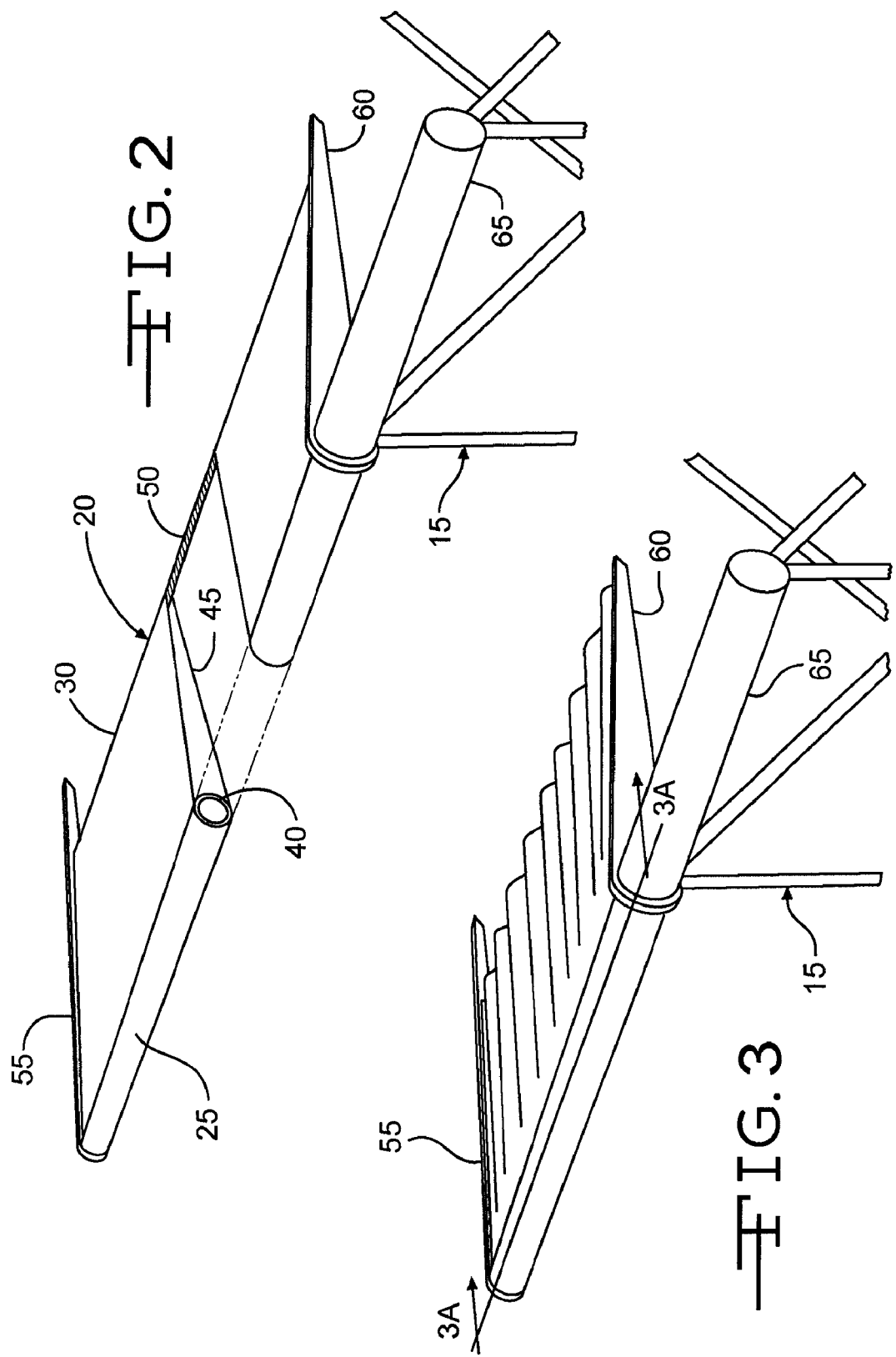
FIG. 2 depicts a top perspective view of an example of one embodiment of a rotor of a rotating cargo delivery system.

Referring to FIG. 2, an example of rotor blade 20 is shown with leading edge 25 and trailing edge 30. Rotor blade 20 may be, for example, in the shape of an airfoil, with leading edge 25 thicker than trailing edge 30 to create lift as rotor blade 20 rotates through air. Spar 40 may be positioned at leading edge 25 to provide stiffness and shape. Skin 45 may cover spar 40 and provide shape of rotor blade 20, such as, for example, the shape of an airfoil. Cable 50 may be positioned at trailing edge 30 and covered by skin 45 to provide stiffness and shape to rotor blade 20. Use of other shapes, thickness distributions, and other structural members, such as, for example, a structure other than cable 50, are contemplated for rotor blade 20.

Rotor blade 20 may be of a fixed length or variable length. A variable length rotor blade 20 may be retractable, extendable, or retractable and extendable. A retractable and extendable example of rotor blade 20 may utilize a hollow telescoping spar 40 which is retractable, extendable, or both retractable and extendable. Skin 45 of rotor blade 20 may be constructed of a suitable flexible material, such as, for example, a nylon fabric sheath, which folds as spar 40 is retract and unfolds as hollow telescoping spar 40 is extended. Skin 45 constructed of a suitable flexible material, such as a nylon fabric sheath, may take the shape of rotor blade 20 as spar 40 is extended and cable 50, positioned at trailing edge 30, is pulled taut. The shape may be, for example, in the form of an airfoil.

Figure 3:
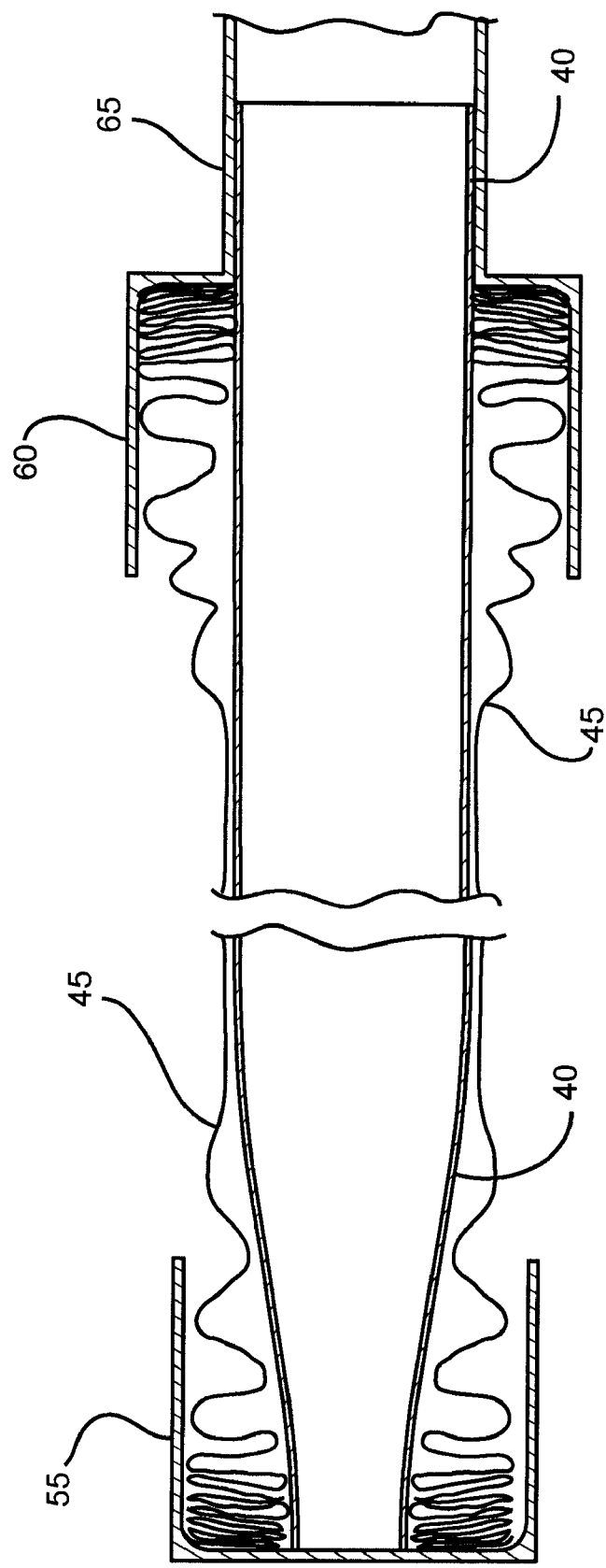

Referring to FIG. 2, FIG. 3, and FIG. 3A a tip rib 55 may be positioned at the tip of rotor blade 20. In addition, a root rib 60 may be positioned at the root of rotor blade 20 and secured to spar 40. Tip rib 55 and root rib 60 may be adapted to stow at least a portion of skin 45 constructed of nylon fabric sheath in a retractable and extendable example of rotor blade 20. In addition, receptacle 65 may be secured to frame 15. Spar 40 may be secured to receptacle 65. Spar 40 may rotate relative to receptacle 65. At least a portion of hollow telescoping spar 40 may be stored inside the receptacle when retracted.

Rotor blade 20, such as the example of one embodiment shown in FIG. 3, may be extended during descent by forces created by drag and rotation. For example, air loads against an exposed portion of skin 45 during descent cause drag and may force skin 45 to unfold, thereby forcing rotor blade 20 to extend. Also, for example, centrifugal forces caused by rotation may force the tip of rotor blade 20 outward, thereby extending rotor blade 20. As shown in FIG. 1, a drogue parachute 21 secured to the tip of rotor blade 20 or tip rib 55 may force rotor blade 20 to extend when the drogue parachute 21 is deployed and causes drag. The drogue parachute 21 may be secured to the tip of rotor blade 20 by a breakaway lanyard 23. Further, another breakaway lanyard 23A secured to the delivery aircraft and the tip of rotor blade 20 may be used to extend rotor blade 20 as the system is dropped from the aircraft.

Figure 4:
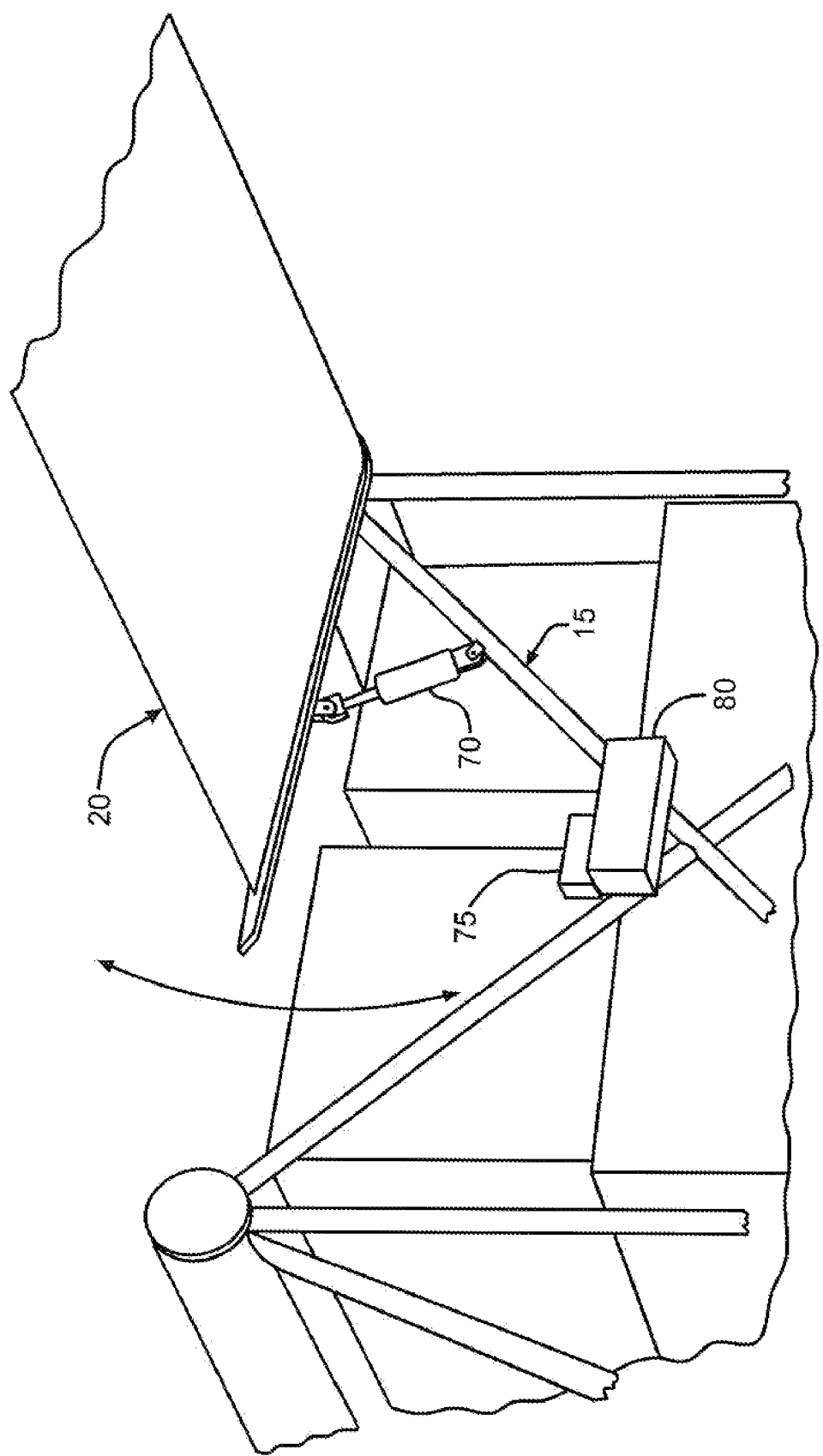
FIG. 4 depicts a bottom perspective view of an example of one embodiment of a rotor of a rotating cargo delivery system.

Referring to FIG. 4, an actuator 70 may be secured to the frame 15 and the rotor blade 20 and may be used to control the pitch angle of the rotor blade 20. Controlling the pitch angle allows for directed flight and control of the rate of descent. Directing flight allows for increased accuracy of delivery at a desired location. Controlling rate of descent may be useful for penetrating hostile air space. For example, the pitch angle may be adjusted to decrease rotational speed so that the rate of descent is increased through the hostile area and just before touch down the pitch angle may be adjusted to increase rotational speed, thereby increasing lift, to decelerate the system 5, resulting in a soft impact.

Control of the pitch angle, and therefore the flight path and rate of descent, may be performed by a guidance control system 75. Guidance control system 75 may include control capable hardware and software. Guidance control system 75 may utilize information regarding system 5 location, position, orientation, velocity, and acceleration to guide the system 5. Guidance control system 75 may receive such information from a location determination system. The location determination system may include commercial global positioning systems and inertial navigation systems. A power source 80 may be used for powering guidance control system 75, the location determination system, and the actuator.

Referring again to FIG. 1, frame 15 may be any structure capable of enclosing cargo and supporting rotor blades 20 during flight, including but not limited to rods, bars, frameworks, containers, enclosures, and housings. Frame 15 may, for example, be constructed out of a plurality of tubes 17 and fittings. Tubes 17 may be positioned in horizontal, diagonal, and intersecting diagonal positions to form frame 15. Utilization all three positions in the construction of frame 15, as shown in FIG. 1, provides frame 15 with adequate strength and stiffness to withstand forces imposed on frame 15 during flight.

It is beneficial for frame 15 to be capable of speedy disassembly in the field without the use of conventional tools, such as screwdrivers and wrenches. For example, in military applications, soldiers may not have access to conventional tools or may need to disassemble frame 15 quickly to access cargo 35 and vacate the area. The assembly shown in FIG. 5 allows for quick disassembly of frame 15 without the use of conventional tools. Referring to FIG. 5, tubes are secured to each other with the use of pin and clevis fittings 90. Pin and clevis fitting 90 may include removable pin 95, lug fitting 100, and clevis fitting 105. For example, horizontal tube 85 with lug fitting 100 is secured to vertical tube 87 with clevis fitting 105 with removable pin 95.

In addition, the tubes may be secured to cargo pallet 10 with overcenter hooks 110 and adjustable foot assemblies 115. For example, overcenter hook 110 may secure horizontal tube 85 to cargo pallet 10 by hooking pallet tie-down ring 114 to hole formed in protrusion 112 from collar 111 secured to horizontal tube 85. Overcenter hook 110 imposes a downward force from horizontal tube 85 toward cargo pallet 10 to hold frame 15 to cargo pallet 10. Adjustable foot assembly 115 may include threaded rod 117, foot 120, threaded intersection collar 125, and handle 130. Foot 120 is secured to the bottom of threaded rod 117 and contacts cargo pallet 10. Threaded rod is positioned to intersect tube 85 through threaded intersection collar 125 and engage female threads 126 in threaded intersection collar 125. Handle 130 is secured to the top of threaded rod 117. When handle 130 is turned such that foot 120 engages cargo pallet 10, adjustable foot assembly 115 imposes an upward force is imposed on horizontal tube 85 from cargo pallet 10 towards horizontal tube 85 to counteract the downward force imposed on horizontal tube 85 by overcenter hook 110, thereby making horizontal tube 85 more stiff and resilient to thermal deformation, as the system 5 may travel from a cold environment in high altitudes to a warm environment on the ground.

The foregoing description of the preferred embodiments of the invention have been presented for purposes of illustration and description, and are not intended to be exhaustive or to limit the invention the precise forms disclosed. The descriptions were selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A system for delivering cargo by airdrop comprising:
    a cargo pallet;
    a frame secured to the cargo pallet;
    at least one rotor blade with a leading edge and a trailing edge, wherein the at least one rotor blade comprises a spar positioned at the leading edge and a skin positioned to cover the spar such that the skin forms a shape of an airfoil, wherein the spar is a hollow telescoping spar which is retractable and extendable, wherein the at least one rotor blade is secured to the frame in a position such that the at least one rotor blade causes the cargo pallet and the frame to rotate in air when dropped from an elevation; and
    a receptacle secured to the frame, from which the hollow telescoping spar is secured and in which at least a portion of the hollow telescoping spar is within the receptacle when retracted.

2. The system of claim 1 wherein the at least one rotor blade comprises two rotor blades.

3. The system of claim 2 wherein the two rotor blades are positioned on opposite sides of the frame such that leading edges of the two rotor blades are positioned to face in opposite directions.

4. The system of claim 1 wherein the at least one rotor blade is at least one of (a) retractable; and (b) extendable.

5. The system of claim 4 wherein the at least one rotor blade is extended during descent from the elevation by at least one of:
    (a) air loads against the skin;
    (b) centrifugal forces;
    (c) a drogue parachute secured to a tip of the at least one rotor blade; and
    (d) a breakaway lanyard secured to the tip of the at least one rotor blade and an aircraft.

6. The system of claim 1 further comprising a cable positioned at the trailing edge of the at least one rotor blade and covered by the skin.

7. The system of claim 6 wherein the skin is constructed of a fabric sheath which folds as the hollow telescoping spar is retracted and unfolds to form the shape of the airfoil as the hollow telescoping spar is extended and the cable positioned at the trailing edge is pulled taut.

8. The system of claim 7 wherein at least a portion of the skin is stowed and unfolds from within at least one of:
    (a) a tip rib positioned at a tip of the at least one rotor blade; and
    (b) a root rib positioned at a root of the at least one rotor blade and secured to the frame.

9. The system of claim 1 further comprising at least one actuator secured to the frame and the at least one rotor blade for controlling a pitch angle of the at least one rotor blade.

10. The system of claim 9 further comprising:
    a guidance control system for guiding the system to a desired drop site;
    a location determination system for use with the guidance control system; and
    a power source for powering the guidance control system, the location determination system, and the at least one actuator.

11. The system of claim 1 wherein the frame is constructed out of a plurality of tubes.

12. The system of claim 11 wherein the plurality of tubes are positioned in horizontal, diagonal, and intersecting diagonal positions.

13. The system of claim 12 wherein the plurality of tubes are secured to the cargo pallet by overcenter hooks and adjustable foot assemblies.

14. The system of claim 11 wherein the plurality of tubes are secured to each other by pin and clevis fittings.

15. A method for constructing a system for delivering cargo by airdrop comprising:
    securing a frame to a cargo pallet;
    securing a receptacle to the frame;
    securing at least one rotor blade to the frame, wherein the at least one rotor blade has a leading edge and a trailing edge and is positioned such that the at least one rotor blade causes the cargo pallet and the frame to rotate in air when dropped from an elevation;
    positioning a spar along the leading edge of the at least one rotor blade, wherein the spar is a hollow telescoping spar which is retractable and extendable;
    securing the hollow telescoping spar to the receptacle such that at least at least a portion of the hollow telescoping spar is within the receptacle when retracted; and
    positioning a skin to cover the spar such that the skin forms a shape of an airfoil.

16. The method of claim 15 further comprising securing two rotor blades to the frame.

17. The method of claim 16 further comprising positioning the two rotor blades on opposite sides of the frame such that leading edges of the two rotor blades are positioned to face in opposite directions.

18. The method of claim 15 wherein the at least one rotor blade is at least one of (a) retractable; and (b) extendable.

19. The method of claim 18 further comprising extending the at least one rotor blade during descent from the elevation by at least one of:
    (a) applying air loads against the skin;
    (b) rotating the cargo pallet such that centrifugal forces extend the at least one rotor blade;
    (c) securing a drogue parachute to a tip of the at least one rotor blade; and
    (d) securing a first end of a breakaway lanyard to the tip of the at least one rotor blade and securing a second end of the breakaway lanyard to an aircraft.

20. The method of claim 15 further comprising:
    positioning a cable at the trailing edge of the at least one rotor blade; and
    covering the cable with the skin.

21. The method of claim 20 wherein the skin is constructed of a fabric sheath.

22. The method of claim 21 further comprising:
    retracting the hollow telescoping spar so that the fabric sheath folds.

23. The method of claim 22 further comprising:
    extending the hollow telescoping spar such that the fabric sheath unfolds to form the shape of the airfoil and the cable positioned at the trailing edge is pulled taut.

24. The method of claim 23 further comprising:
    securing a tip rib to a tip of the at least one rotor blade; and
    stowing at least a portion of the skin within the tip rib.

25. The method of claim 24 further comprising:
    securing a root rib to a root of the at least one rotor blade; and
    stowing at least a portion of the skin within the root rib.

26. The method of claim 15 further comprising securing at least one actuator to the frame and the at least one rotor blade for controlling a pitch angle of the at least one rotor blade.

27. The method of claim 15 further comprising constructing the frame out of a plurality of tubes.

28. The method of claim 27 further comprising arranging the plurality of tubes in a horizontal, a diagonal, and an intersecting diagonal positions.

29. The method of claim 28 further comprising securing the plurality of tubes to each other by utilizing pin and clevis fittings.

30. The method of claim 29 further comprising securing the plurality of tubes to the cargo pallet by utilizing overcenter hooks and adjustable feet assemblies.

* * * * *